United States Patent [19]

Parmley, Sr.

[11] Patent Number: 5,508,597
[45] Date of Patent: Apr. 16, 1996

[54] QUICK EXCHANGE BATTERY APPARATUS FOR BATTERY POWERED VEHICLES AND METHOD THEREFOR

[76] Inventor: Dan W. Parmley, Sr., 129 E. Citation, Tempe, Ariz. 85284

[21] Appl. No.: 342,152

[22] Filed: Nov. 18, 1994

[51] Int. Cl.[6] .................................................. H01M 10/42
[52] U.S. Cl. ................................ 320/2; 320/15; 414/281; 104/34
[58] Field of Search ...................... 320/15, 2, 5; 414/281, 414/282, 283, 284; 104/34

[56] References Cited

U.S. PATENT DOCUMENTS

| | | | |
|---|---|---|---|
| 4,450,400 | 5/1984 | Gwyn | 320/2 |
| 4,998,858 | 3/1991 | Magens | 414/282 X |
| 5,187,423 | 2/1993 | Marton | 320/2 |

Primary Examiner—Peter S. Wong
Assistant Examiner—Edward Tso
Attorney, Agent, or Firm—Harry M. Weiss; Jeffrey D. Moy; Harry M. Weiss & Associates

[57] ABSTRACT

An apparatus for storing and changing battery packs from a battery powered vehicle. The battery powered vehicle drives toward a light source which aligns the battery powered vehicle with the apparatus. The apparatus is moved in a horizontal plane to a position underneath a battery holding location on the battery powered vehicle. An operator moves pneumatic carrier to a position directly underneath a battery pack located in the battery holding location. The apparatus is then moved in a vertical plane so that the pneumatic carrier engages a bottom section of the battery pack. The pneumatic carrier is then activated thereby lifting the battery pack on a cushion of air. This allows the operator to move the battery pack out of the battery holding location, across a platform deck of the apparatus, and to a storage location. The operator can then use the pneumatic carrier to move a fresh battery pack located in a different storage location to the battery powered vehicle.

23 Claims, 4 Drawing Sheets fig. 1A fig. 1 fig. 2 fig. 12 fig. 13 fig. 14 fig. 15

QUICK EXCHANGE BATTERY APPARATUS FOR BATTERY POWERED VEHICLES AND METHOD THEREFOR

BACKGROUND OF THE INVENTION

1. Field of the Invention

This invention relates generally to a battery exchange system, and more specifically, to a battery exchange system for replacing a depleted battery pack in a battery powered vehicle with a fresh battery pack and method therefor.

2. Description of the Prior Art

Currently there are numerous devices and methods for removing a depleted battery pack from a battery powered vehicle and replacing the battery pack with a fresh battery pack. U.S. Pat. No. 5,187,423 discloses an apparatus, for replacing a discharged battery pack from a battery powered vehicle, which uses a forklift type device for lifting and moving the discharged battery pack. The problem with this apparatus, and other battery replacement systems which use a forklift type device for lifting and moving the battery pack, is that the use of a forklift type device raises the possibility of damage to the battery pack as well as damage to the battery powered vehicle. Inexperience or inattentive forklift operators have a tendency to misalign the lifting plates of the forklift thereby stabbing the battery pack or the battery powered vehicle with the lifting plates.

Other types of battery exchange systems use a chainfall or block and tackle hoist arrangement to move the battery pack. These types of systems require an operator to connect the hoist to the discharged battery pack in the battery powered vehicle, lift the battery pack out of the battery powered vehicle, and move the hoist to a position to off load the spent battery. The hoist is then moved to a position where a fully charged battery pack is located. The hoist is connected to the fully charged battery pack, moved to a position next to the battery powered vehicle, and the fully charged battery pack is lowered into the battery powered vehicle. While these types of systems do work, they require a tremendous amount of time and effort on the part of the operator in order to exchange the battery pack.

Another type of battery exchange system uses a hoist in conjunction with a roll off dolly. U.S. Pat. No. 4,450,400 discloses a battery exchange system which uses a hoist like structure in combination with a support mechanism having a plurality of rollers to replace a discharged battery pack in a battery powered vehicle. In this system, a discharged battery pack in a battery powered vehicle is rolled off a support mechanism having a plurality of rollers onto a hoist like structure also having a support mechanism having a plurality of rollers. The hoist is then moved to a location where the discharged battery pack is rolled off of the support mechanism and placed in a location for recharging the depleted battery pack. The hoist is then moved to a new location where a charged battery pack is rolled onto the support mechanism of the hoist. The hoist is then moved to a position next to the battery powered vehicle where the charged battery pack is rolled off of the support mechanism of the hoist and onto a support mechanism of the battery powered vehicle. While the plurality of rollers on the support mechanism may aid in the replacement of the battery pack, this type of system still requires a great deal of effort on the part of an individual who is attempting to replace the depleted battery pack. A typical battery pack used on a battery powered vehicle may weigh anywhere from 1,500 lbs to over 2,000 lbs. Thus, even if the battery pack is on a plurality of rollers, the battery pack would still be very difficult to move.

Therefore, a need existed to provide an apparatus and method for replacing a depleted battery pack in a battery powered vehicle and replacing it with a fresh battery pack having stored energy. The apparatus and method must be capable of replacing the battery pack in a short amount of time and with minimal effort on the part of an individual who is operating the battery exchange apparatus.

SUMMARY OF THE INVENTION

It is an object of the present invention to provide an improved battery exchange apparatus for replacing a battery pack in a battery powered vehicle that is especially useful for a battery powered mass transit vehicle and method therefor.

It is another object of the present invention to provide an improved battery exchange apparatus and method for replacing a battery pack in a battery powered vehicle, especially useful for a battery powered mass transit vehicle, that will allow an operator of the apparatus to remove a depleted battery pack in a battery powered vehicle and replace it with a fresh battery pack in a minimal amount of time and with minimal effort.

BRIEF DESCRIPTION OF THE PREFERRED EMBODIMENT

In accordance with one embodiment of the present invention, an apparatus for replacing a battery pack in a battery powered vehicle, especially useful for a battery powered mass transit vehicle, is disclosed. The apparatus has a platform deck movable along both a horizontal plane and a vertical plane. Positioned on the platform deck is at least one storage location for the battery pack. Roller means are coupled to the platform deck for moving the platform deck in the horizontal plane so that the platform deck may be positioned underneath a battery holding location located on the battery powered vehicle. Pneumatic carrier means are provided for moving the battery pack. The pneumatic carrier means uses air for both lifting and moving the battery pack from the storage location on the platform deck across the platform deck to the battery holding location on the battery powered vehicle and uses air for both lifting and moving the battery pack from the battery holding location on the battery powered vehicle across the platform deck to the storage location. Lifting means are coupled to the platform deck for raising and lowering the platform deck in a vertical plane and for allowing the platform deck to be raised to a position directly underneath the battery pack so that the pneumatic carrier means may lift and move a battery pack having no more stored energy and substitute a fresh battery pack having stored energy for the battery pack that has no more stored energy.

In accordance with another embodiment of the present invention, a method for replacing a depleted battery pack in a battery powered vehicle (especially useful for a battery powered mass transit vehicle) is disclosed comprising the steps of providing an apparatus for replacing the depleted battery pack. The apparatus comprises a platform deck movable along both a horizontal plane and a vertical plane; at least one storage location for the battery pack positioned on the platform deck; roller means coupled to the platform deck for moving the platform deck along the horizontal plane so as to position the platform deck underneath a battery holding location located on the battery powered vehicle; pneumatic carrier means using air for both lifting and moving the battery pack from the storage location on the platform deck across the platform deck to the battery holding location on the battery powered vehicle and using air for both lifting and moving the battery pack from the battery holding location on the battery powered vehicle across the platform deck to the storage location; and lifting means coupled to the platform deck for raising and lowering the platform deck in a vertical plane and for allowing the platform deck to be raised to a position directly underneath the battery pack so that the pneumatic carrier means may lift and move a battery pack that has no more stored energy and substitute a fresh battery pack having stored energy for the battery pack that has no more stored energy. The platform deck is moved along the horizontal plane to a position underneath the battery holding location on the battery powered vehicle. The pneumatic carrier means are then moved to a position underneath the depleted battery pack in the battery powered vehicle. The platform deck is raised in the vertical plane so that a lifting surface on the pneumatic carrier means engages a bottom surface on the depleted battery pack. Air flow means on the pneumatic carrier means are activated so that the pneumatic carrier means lifts the depleted battery pack out of the battery holding location on the battery powered vehicle. The depleted battery pack is moved on the pneumatic carrier means from the battery holding location across the platform deck to a first storage location. The air flow means are then deactivated causing the depleted battery pack to be lowered into place at the first storage location. The pneumatic carrier means are removed from the depleted battery pack. The pneumatic carrier means are then moved underneath a fresh battery pack having stored energy which is located at a second storage location. Air flow means on the pneumatic carrier means are activated so that the pneumatic carrier means lifts the fresh battery pack from the second storage location. The fresh battery pack is moved on the pneumatic carrier means across the platform deck to the battery holding location on the battery powered vehicle. The air flow means are deactivated causing the fresh battery pack to be lowered into place on the battery holding location on the battery powered vehicle. The pneumatic carrier means are then removed from the fresh battery pack.

DETAILED DESCRIPTION OF THE PREFERRED EMBODIMENT

Figures 1, 1A:
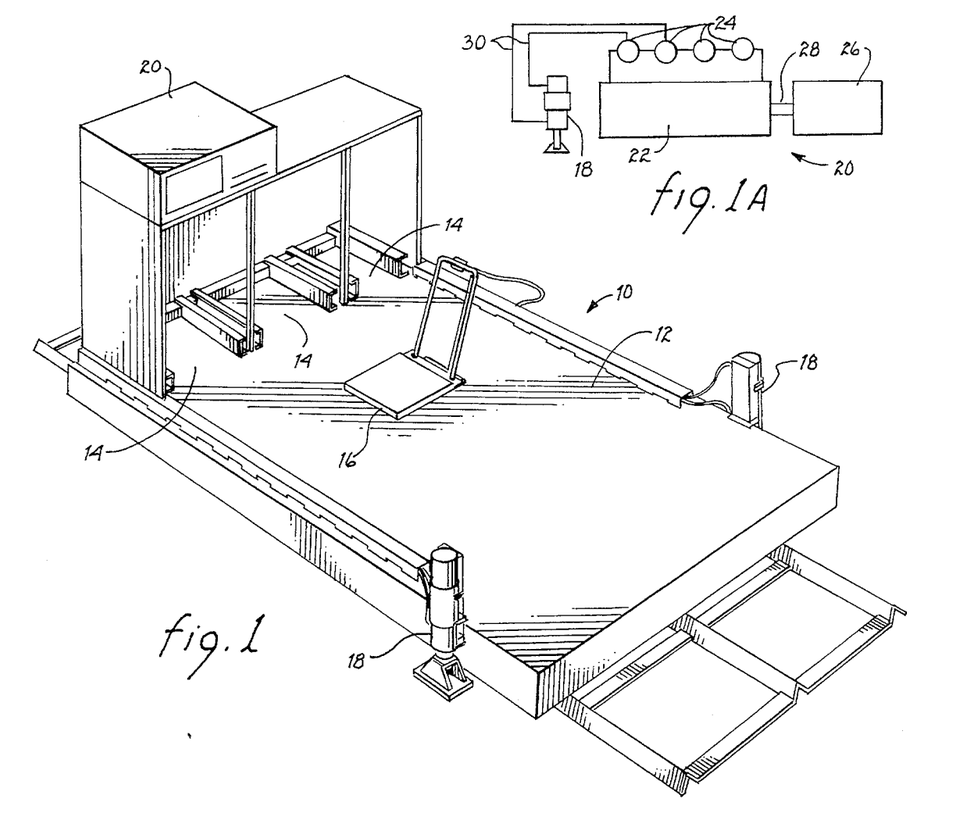
FIG. 1 is a perspective view of a battery exchange apparatus in accordance with the present invention.
FIG. 1A is a front view of a hydraulic pump which is located on the battery exchange apparatus of FIG. 1.

Referring to FIG. 1, a general view of a battery exchange apparatus 10 (hereinafter "apparatus") is shown. The apparatus 10 comprises a platform deck 12. A multiple of storage locations 14 are positioned on the platform deck 12. Each storage location 14 contains enough space to store a battery pack (not shown) from a battery powered vehicle (not shown). The storage location 14 may contain a battery charging unit (not shown) for recharging a depleted battery pack. The battery charging unit may be positioned inside the battery storage location 14, or it may be located outside the apparatus 10 with cables running to the appropriate storage location. Pneumatic carrier means 16 are provided to move the battery pack from the storage location 14 to the battery powered vehicle and for moving the battery pack from the battery powered vehicle to the storage location 14. Lifting means 18 are coupled to the platform deck 12 to raise and lower the platform deck 12 in a vertical plane. Lifting means 18 comprises a plurality of hydraulic cylinders in the preferred embodiment. The lifting means 18 are forced to move in the vertical plane by a pressurized liquid means 20 positioned on the platform deck 12. The pressurized liquid means 20 could also be positioned off of the apparatus 10 as long as conduit means are provided for connecting the pressurized liquid means 20 to the lifting means 18.

Referring to FIG. 1A, the pressurized liquid means 20 comprises a hydraulic pump 22 coupled to a plurality of valves 24. A driving motor 26, coupled to the hydraulic pump 22 through a shaft 28, is used to force a liquid through the plurality of valves 24 and through conduit means 30 to enable the lifting means 18 to raise and lower the platform deck (see FIG. 1) in the vertical plane.

Figures 4, 5, 6, 7, 8:
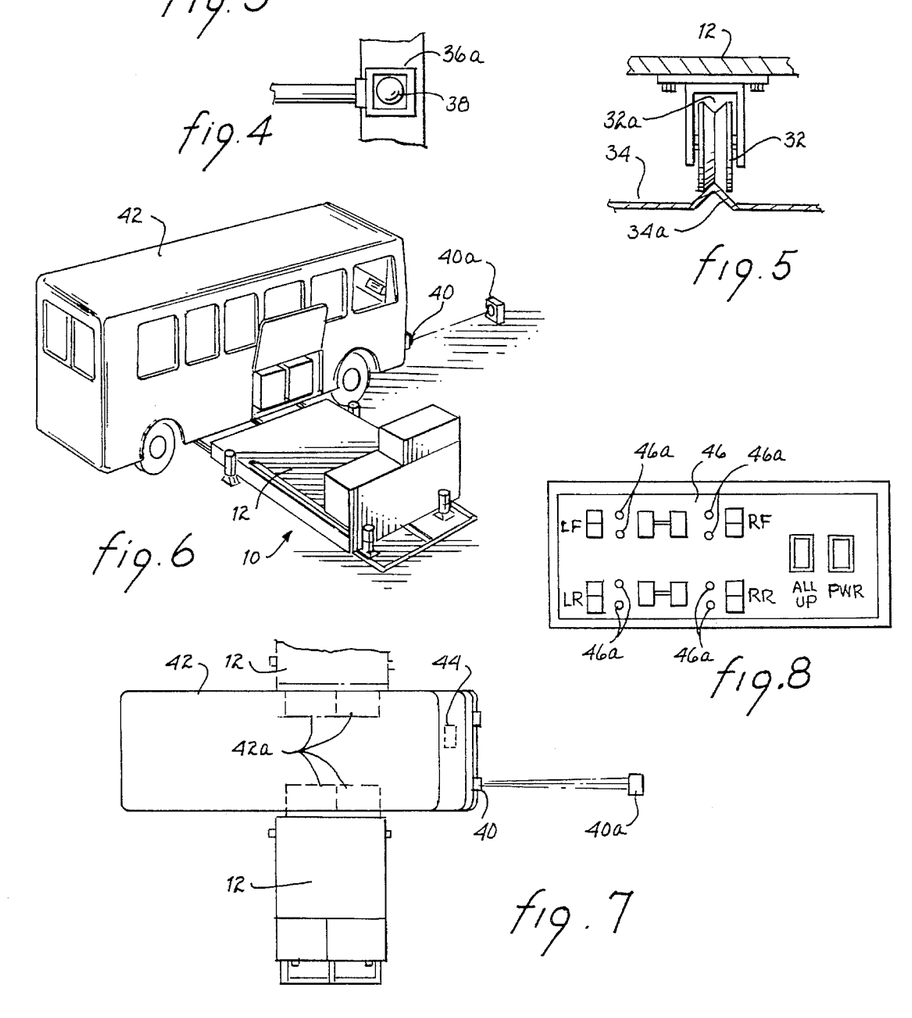
FIG. 4 is a top view of connecting means located on one end of the hydraulic cylinder means of FIG. 2.
FIG. 5 is an end view of a portion of the battery exchange apparatus of FIG. 1 showing how the battery exchange apparatus moves in a horizontal plane.
FIG. 6 is a perspective view of the battery exchange apparatus of FIG. 1 when used in conjunction with a battery powered vehicle and sensor means to align the battery powered vehicle with the battery exchange apparatus.
FIG. 7 is a top view of FIG. 6 further showing a battery exchange system positioned on both sides of the battery powered vehicle.
FIG. 8 is a front view of control means used for raising and lowering the battery exchange apparatus of FIG. 1 in a vertical plane and for moving the battery exchange apparatus of FIG. 1 in the horizontal plane.

Referring to FIG. 8, the pressurized liquid means 20 (shown in FIG. 1A) has control means 46 for allowing an operator of the apparatus (not shown) to raise and lower the lifting means (see FIG. 1) individually or simultaneously. The control means 46 further comprises leveling sensor means (not shown) located on the platform deck (not shown) for determining if the platform deck is completely level. The leveling sensor means are connected to a plurality of indicator means 46a located on the control means 46. The indicator means directs the operator of the apparatus as to which lifting means needs to be raised or lowered in order for the platform deck to be completely level.

Figure 2:
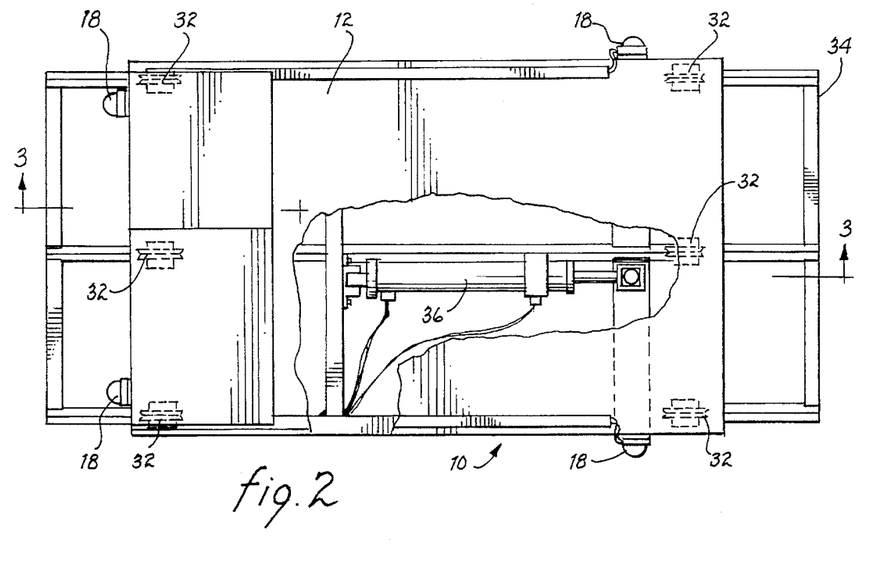
FIG. 2 is a top view of the battery exchange system of FIG. 1, a portion showing a top view of the hydraulic cylinder means located underneath the battery exchange apparatus.

Referring to FIG. 2, the apparatus 10 has roller means 32 coupled to the platform deck 12 for moving the platform deck along a horizontal plane. The roller comprises a plurality of wheels in the preferred embodiment. The roller means 32 are placed upon railing system means 34. The railing system means 34 forms a track which acts as a guide to keep the platform deck 12 moving along a substantially straight line in the horizontal plane.

Referring to FIG. 5, the roller means 32 are shown to have a V-shape groove 32a. The railing system means 34 are made out of angle iron and comprises an inverted V-shape track 34 upon which the V-shape groove 32a of the roller means 32 are situated upon. The inverted V-shape track 34a acts as a guide for the V-shape groove 32a to ride upon, thus keeping the platform deck 12 moving in a substantially straight direction in the horizontal plane.

Referring back to FIG. 2, hydraulic cylinder means 36, for moving the platform deck 12 in the horizontal plane, are shown. The hydraulic cylinder means 36 are located underneath the platform deck 12.

Figure 3:
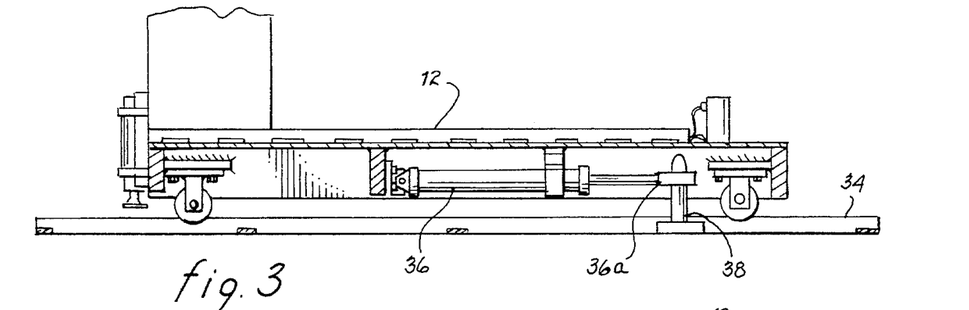
FIG. 3 is a side view of the battery exchange apparatus of FIG. 1.

Referring to FIGS. 3 and 4, the hydraulic cylinder means 36 has two ends. One end of the hydraulic cylinder means 36 is coupled to the platform deck 12. The other end of the hydraulic cylinder means 36 has connecting means 36a for allowing a pin 38 which is coupled to the railing system means 34 to pass through the connecting means 36a and to allow the connecting means 36a to move up and down on the pin 38 when the platform deck 12 is raised and lowered in the vertical plane. The hydraulic cylinder means 36 are coupled to pressurized liquid means (not shown) for extending and retracting the hydraulic cylinder means 36. The pressurized liquid means comprises a hydraulic pump coupled to a plurality of valves. A driving motor, coupled to the hydraulic pump through a shaft, is used to force a liquid through the plurality of valves and through conduit means to extend and retract the hydraulic cylinder means 36 thereby moving the platform deck 12 in the horizontal plane. The hydraulic cylinder means 36 may be coupled to control panel means 46 (see FIG. 8) to allow an operator of the apparatus to move the platform deck 12 in the horizontal plane.

Referring to FIG. 6, the apparatus 10 is shown to further include sensor means for aligning a battery powered vehicle 42 with platform deck 12. The sensor means comprises a light sensor 40 positioned on a front portion of the battery powered vehicle 42. Light source means 40a positioned on a side portion of the platform deck 12 engages the light sensor 40 to allow a driver of the battery powered vehicle 42 to properly align the battery powered vehicle 42 with the platform deck 12. An infrared light source is used in the preferred embodiment of the present invention.

Referring to FIG. 7, the light source means 40a emits a beam of light which engages the light sensor 40 positioned on a front portion of the battery powered vehicle 42. Indicator means 44 located inside the battery powered vehicle 42 directs a driver of the battery powered vehicle 42 as to how to align the battery powered vehicle 42 so that a battery holding location 42a on the battery powered vehicle 42 is positioned directly in front of the platform deck 12. FIG. 7 further shows that apparatus 10 (shown in FIG. 1) may be placed on either side or on both sides of the battery powered vehicle 42. Once the battery powered vehicle 42 is properly aligned, the platform deck 12 is moved in the horizontal plane to a position underneath the battery holding location 42a on the battery powered vehicle 42.

Figure 9:
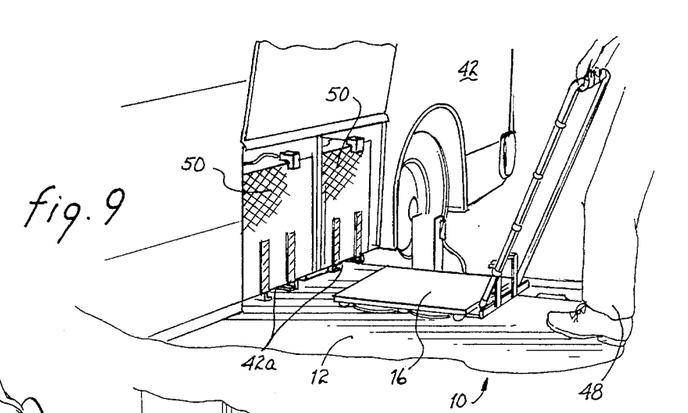
FIG. 9 is a perspective view of an operator positioning pneumatic carrier means in order to remove a battery pack from a battery powered vehicle.
Figure 10:
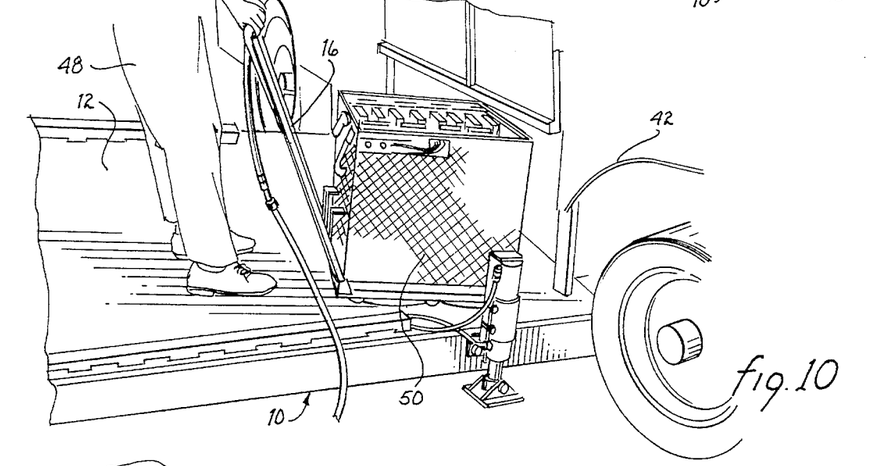
FIG. 10 is a perspective view of an operator using pneumatic carrier means to move a battery pack.
Figure 11:
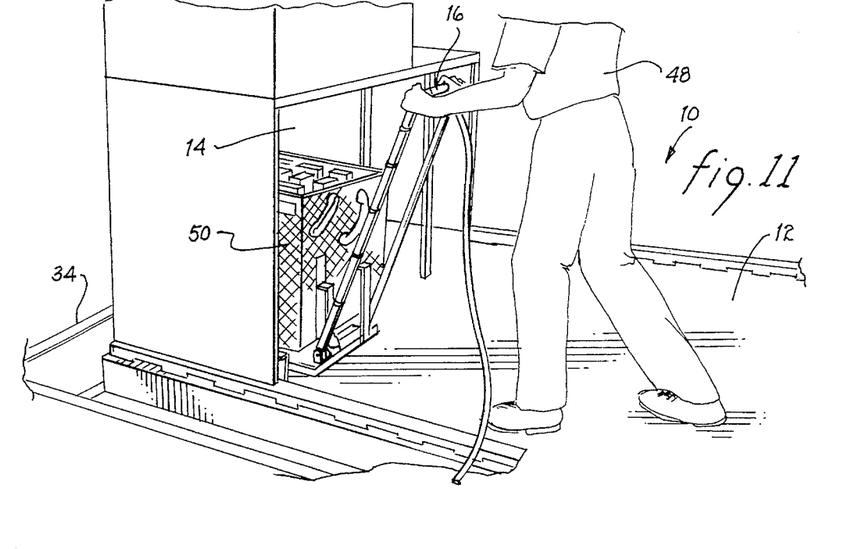
FIG. 11 is a perspective view of a operator using pneumatic carrier means to move a battery pack to a storage location on the battery exchange apparatus of FIG. 1.

Removal and installation of a battery pack 50 into the battery powered vehicle 42 is illustrated in FIGS. 9–11. Once the platform deck 12 is moved to a position underneath the battery holding location 42a of the battery powered vehicle 42, an operator 48 of the apparatus 10 moves the pneumatic carrier means 16 to a position directly underneath the battery pack 50 located in battery holding location 42a. The platform deck 12 is then raised in the vertical plane so that the pneumatic carrier means 16 engages a bottom surface of the battery pack 50. Battery power cable means (not shown) for providing a source of power from the battery pack 50 to the battery powered vehicle 42 are disconnected. The pneumatic carrier means 16 are activated causing the pneumatic carrier means 16 to lift the battery pack 50 out of the battery holding location 42a. The operator 48 then moves the battery pack 50 out of the battery holding location 42a, across the platform deck 12, and into a storage location 14 (see FIG. 11). The pneumatic carrier means are then deactivated causing the battery pack to be lowered into place in the storage location 14.

The pneumatic carrier means 16 are then removed from underneath the battery pack 50 and placed under a fresh battery pack 50 stored in a second storage location 14. The pneumatic carrier means 16 are then activated thereby lifting the fresh battery pack 50 out of the second storage location 14. The fresh battery pack 50 is moved on the pneumatic carrier means 16 across the platform deck 12 to the battery holding location 42a on the battery powered vehicle 42. The pneumatic carrier means 16 are deactivated causing the fresh battery pack 50 to be lowered into place in the battery holding location 42a. The pneumatic carrier means 16 are then removed from underneath the fresh battery pack 50 and the battery power cable means are reconnected to the fresh battery pack 50.

Once the pneumatic carrier means 16 is removed from underneath the fresh battery pack 50, the platform deck 14 is lowered in the vertical plane so that the roller means (not shown) engage the railing system means 34. The platform deck 12 is then moved on the railing system means 34 in the horizontal plane so that the platform deck 12 is no longer situated underneath the battery powered vehicle 42.

Figures 12, 13:
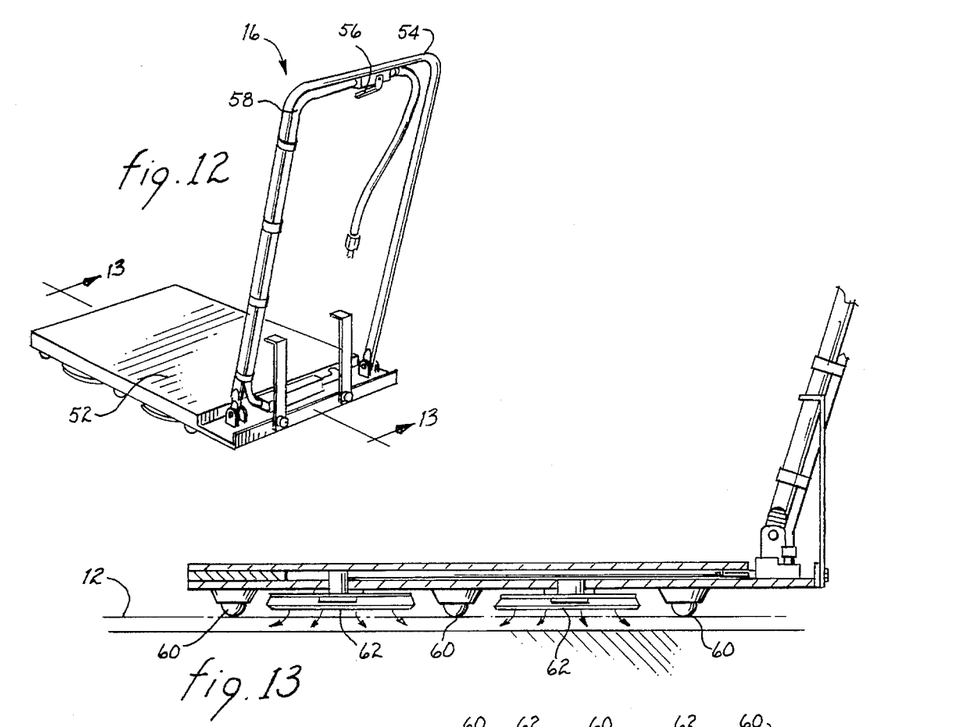
FIG. 12 is a perspective view of the pneumatic carrier means shown in FIG. 1 and used by the operator in FIGS. 9–11.
FIG. 13 is a cross-sectional view of the pneumatic carrier means of FIG. 12 taken along line 13–13.

Referring to FIG. 12, the pneumatic carrier means 16 are shown in more detail. Pneumatic carrier means 16 has a lifting surface 52 coupled to handle means 54. A pneumatic valve 56 is positioned on the handle means 54 for controlling a source of compressed air (not shown). One end of the pneumatic valve 56 is connected to conduit means 58. Conduit means 58 are used for providing a source of compressed air to the lifting surface 52. The other end of the pneumatic valve 56 is connected to air compressor means (not shown). The air compressor means is used for providing a source of compressed air to the pneumatic carrier means 16.

Figures 14, 15:
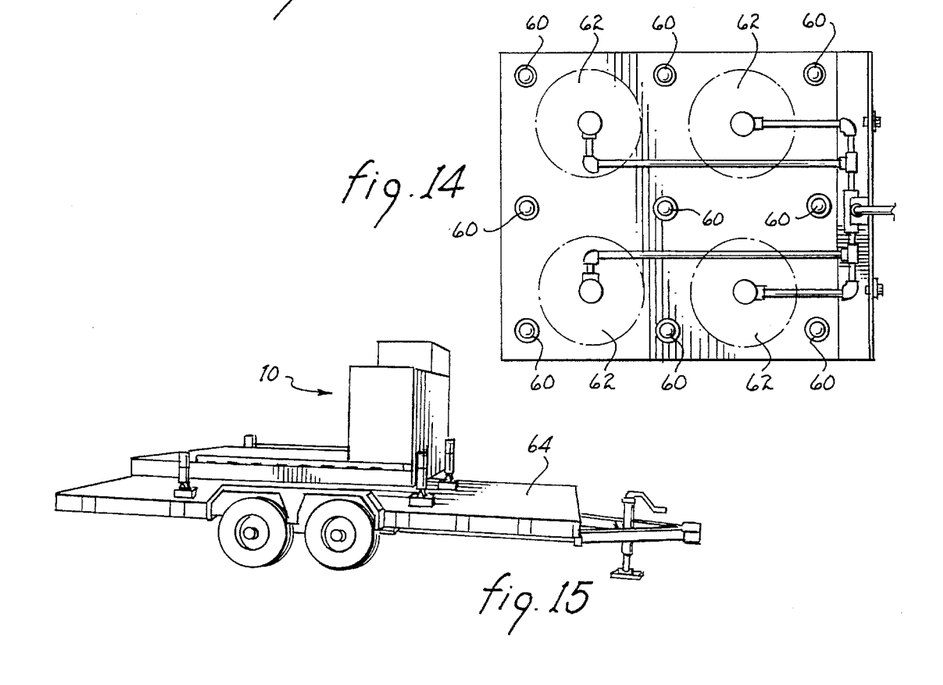
FIG. 14 is a bottom view of the pneumatic carrier means of FIG. 12.
FIG. 15 is a perspective view showing the portability of the battery exchange apparatus of FIG. 1.

Referring to FIGS. 13–14, ball bearing roller means 60 are coupled to the lifting surface 52 for moving the pneumatic carrier means 16 (see FIG. 12) on the platform deck 12 when the pneumatic carrier means 16 is not activated. Air bearing means 62 are also coupled to the lifting surface 52 (see FIG. 12). The air bearing means 62 are used for allowing air to flow through the air bearing means 62 in order to lift the lifting surface 52 of the pneumatic carrier means 16.

When the pneumatic valve 56 is in a position so as to deactivate the pneumatic carrier means, there is no airflow through the air bearing means 62. As such, the lifting surface 52 simply rest on ball bearing roller means 60 which are in contact with the platform deck 12. However, when the pneumatic valve is turned so as to activate the pneumatic carrier means 16, airflow is provided to the air bearing means 62 (see FIG. 13). The air flow lifts the lifting surface 52 off the ball bearing roller means 62 to a position substantially parallel to and above the platform deck 12. This lifting action is what causes the pneumatic carrier means 16 to pick up the battery pack (not shown). When the pneumatic carrier means 16 are activated, lifting surface 52 hovers above the platform deck 12 on a cushion of air. The cushion of air allows the pneumatic carrier means 16 to be moved on the platform deck 12 with ease, even when loaded with a 2000 lb. battery pack (not shown).

Referring to FIG. 15, it is shown that the apparatus 10 is highly mobile. The apparatus 10 may be loaded onto a trailer 64 and moved to any location where the apparatus 10 may be needed.

The present invention stands in stark contrast to the battery replacement systems of the prior art which requires a significant amount of time, skill, and effort in replacing a depleted battery pack in a battery powered vehicle. The apparatus 10 allows an operator to exchange a depleted battery pack with a fresh battery pack in about four minutes with very little skill or effort on the part of the operator.

While the present invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for replacing a battery pack in a battery powered vehicle especially useful for a battery powered mass transit vehicle comprising, in combination:

a platform deck movable along both a horizontal plane and a vertical plane;

at least one storage location for the battery pack positioned on the platform deck;

roller means coupled to the platform deck for moving the platform deck along the horizontal plane so as to position the platform deck underneath a battery holding location located on the battery powered vehicle;

pneumatic carrier means using air for both lifting and moving the battery pack from the storage location on the platform deck across the platform deck to the battery holding location on the battery powered vehicle and using air for both lifting and moving the battery pack from the battery holding location on the battery powered vehicle across the platform deck to the storage location; and lifting means coupled to the platform deck for raising and lowering the platform deck in a vertical plane and for allowing the platform deck to be raised to a position directly underneath the battery pack so that the pneumatic carrier means may lift and move a battery pack that has no more stored energy and substitute a fresh battery pack having stored energy for the battery pack that has no more stored energy.

2. An apparatus in accordance with claim 1 further comprising sensor means for aligning the battery powered vehicle to the platform deck.

3. An apparatus in accordance with claim 2 wherein the sensor means comprises:

at least one light sensor positioned on a front portion of the battery powered vehicle; and light source means positioned on a side portion of the platform deck for engaging the light sensor to allow an operator of the battery powered vehicle to properly align the battery powered vehicle with the platform deck when the battery powered vehicle comes towards the light source means.

4. An apparatus in accordance with claim 3 wherein the light source means are an infrared light source.

5. An apparatus in accordance with claim 3 further comprising indicator means located inside the battery powered vehicle for directing an operator of the battery powered vehicle how to align the battery powered vehicle with the platform deck.

6. An apparatus in accordance with claim 1 further comprising a battery charging unit positioned in each storage location.

7. An apparatus in accordance with claim 1 wherein the lifting means comprises a plurality of hydraulic cylinders that raise and lower the platform deck in the vertical plane.

8. An apparatus in accordance with claim 7 wherein the lifting means further comprises pressurized liquid means for raising and lowering the plurality of hydraulic cylinders.

9. An apparatus in accordance with claim 8 wherein the pressurized liquid means comprises:

conduit means coupled to the plurality of hydraulic cylinders for providing a source of pressurized liquid to the plurality of hydraulic cylinders for raising and lowering the plurality of hydraulic cylinders;

a plurality of valves coupled to the conduit means on one end and to the source of the pressurized liquid on the other end; and a hydraulic pump coupled to the plurality of valves, a driving motor coupled to the hydraulic pump through a shaft, the hydraulic pump forcing a liquid through the plurality of valves and through the conduit means to enable the plurality of hydraulic cylinders to raise and lower the platform deck.

10. An apparatus in accordance with claim 9 wherein the pressurized liquid means further comprises control means for allowing an operator of the apparatus to raise and lower the plurality of hydraulic cylinders at least one of individually and simultaneously.

11. An apparatus in accordance with claim 10 wherein the control means further comprises leveling sensor means positioned on the platform deck for allowing the operator who is raising and lowering the platform deck to determine if the platform deck is completely level.

12. An apparatus in accordance with claim 1 wherein said roller means comprises a plurality of wheels coupled to the platform deck.

13. An apparatus in accordance with claim 12 wherein said roller means further comprises railing system means for forming a track upon which the plurality of wheels are situated upon, the railing system means acting as a guide to keep the platform deck moving along a substantially straight line in the horizontal plane.

14. An apparatus in accordance with claim 13 wherein said roller means further comprises:

a pin coupled to the railing system means; and hydraulic cylinder means having two ends for moving the platform deck along the railing system means in the horizontal plane, one end of the hydraulic cylinder means being coupled to the platform deck, the second end of the hydraulic cylinder means having connecting means for allowing the pin to pass through the connecting means and for allowing the connecting means to move up and down on the pin when the platform deck is raised and lowered in the horizontal plane.

15. An apparatus in accordance with claim 14 wherein the hydraulic cylinder means further comprises pressurized liquid means for extending and retracting the hydraulic cylinder means to move the platform deck along the horizontal plane.

16. An apparatus in accordance with claim 15 wherein said pressurized liquid means comprises:

conduit means coupled to the hydraulic cylinder means for providing a source of pressurized liquid to the hydraulic cylinder means for expanding and contracting the hydraulic cylinder means;

a plurality of valves coupled to the conduit means on one end and to the source of the pressurized liquid on the other end; and a hydraulic pump coupled to the plurality of valves, a driving motor coupled to the hydraulic pump through a shaft, the hydraulic pump forcing a liquid through the plurality of valves and through the conduit means to expand and contract the hydraulic cylinder means to move the platform deck in the horizontal plane.

17. An apparatus in accordance with claim 1 wherein the pneumatic carrier means comprises, in combination:

a lifting surface;

a plurality of ball bearing roller means coupled to the lifting surface for moving the pneumatic carrier means on the platform deck when the pneumatic carrier means are not activated;

a plurality of air bearing means coupled to the lifting surface for allowing air to flow through the plurality of air bearing means and to lift the lifting surface to a position substantially parallel to and above the platform deck where the plurality of ball bearing roller means are separated from the platform deck when the pneumatic carrier means are activated; and air flow means for providing a source of compressed air to the plurality of air bearing means for lifting and moving the battery pack.

18. An apparatus in accordance with claim 17 wherein the pneumatic carrier means further comprises handle means coupled to the lifting surface for allowing an operator to move the pneumatic carrier means.

19. An apparatus in accordance with claim 17 wherein the air flow means comprises:

conduit means coupled to the plurality of air bearing means for providing a source of compressed air to the plurality of air bearing means; and a pneumatic valve coupled to the conduit means on one end and coupled to the source of compressed air on the other end, the pneumatic valve having a first and a second position, the first position coupling the source of compressed air to the plurality of air bearing means to activate the pneumatic carrier means, and the second position disconnecting the source of compressed air from the plurality of air bearing means to deactivate the pneumatic carrier means.

20. An apparatus in accordance with claim 19 wherein the air flow means further comprises air compressor means for providing the source of compressed air to the pneumatic carrier means.

21. A method for replacing a discharged battery pack in a battery powered vehicle especially useful for a mass transit battery powered vehicle, comprising the steps of:

providing an apparatus for replacing the discharged battery pack comprising, in combination:

a platform deck movable along both a horizontal plane and a vertical plane;

at least one storage location for the battery pack positioned on the platform deck;

roller means coupled to the platform deck for moving the platform deck along the horizontal plane so as to position the platform deck underneath a battery holding location located on the battery powered vehicle;

pneumatic carrier means using air for both lifting and moving the battery pack from the storage location on the platform deck to the battery holding location on the battery powered vehicle and using air for both lifting and moving the battery pack from the battery holding location on the battery powered vehicle across the platform deck to the storage location; and lifting means coupled to the platform deck for raising and lowering the platform deck in a vertical plane and for allowing the platform deck to be raised to a position directly underneath the battery pack so that the pneumatic carrier means may lift and move a battery pack that has no more stored energy and substitute a fresh battery pack having stored energy for the battery pack that has no more electrical charge;

moving the platform deck along the horizontal plane to a position underneath the battery holding location on the battery powered vehicle;

moving the pneumatic carrier means underneath a depleted battery pack in the battery powered vehicle;

raising the platform deck in the vertical plane so that a lifting surface on the pneumatic carrier means engages a bottom surface on the depleted battery pack of the battery powered vehicle;

activating air flow means to the pneumatic carrier means so that the pneumatic carrier means lifts the depleted battery pack out of the battery holding location on the battery powered vehicle;

moving the depleted battery pack on the pneumatic carrier means from the battery holding location on the battery powered vehicle across the platform deck to a first storage location;

deactivating the air flow means to the pneumatic carrier means causing the depleted battery pack to be lowered into place at the first storage location;

removing the pneumatic carrier means from the depleted battery pack;

moving the pneumatic carrier means underneath a fresh battery pack located at a second storage location;

activating the air flow means to the pneumatic carrier means so that the pneumatic carrier means lifts the fresh battery pack from the second storage location;

moving the fresh battery pack on the pneumatic carrier means across the platform deck to the battery holding location on the battery powered vehicle;

deactivating the air flow means to the pneumatic carrier means so that the fresh battery pack may be lowered into place on the battery holding location on the battery powered vehicle; and removing the pneumatic carrier means from the fresh battery pack.

22. The method of claim 21 further comprising the steps of:

lowering the platform deck so that the roller means engage a substantially level ground; and moving the platform deck in the horizontal plane so that the platform deck is no longer underneath the battery powered vehicle.

23. The method of claim 22 further comprising the steps of:

disconnecting a power cable which provides battery power to the battery powered vehicle from the depleted battery pack; and connecting the power cable to the fresh battery pack.

\* \* \* \* \*